United States Patent [19]

Morello et al.

[11] 4,090,089
[45] May 16, 1978

[54] SEQUENTIAL CODED COMPUTERIZED ANTI-THEFT LOCK

[76] Inventors: Philip P. Morello, P.O. Box 261, Collegeville; David M. Seroski, 02 Wartman Rd., Graterford, both of Pa. 19426

[21] Appl. No.: 671,731

[22] Filed: Apr. 14, 1976

[51] Int. Cl.² .................................................. H02J 3/14
[52] U.S. Cl. ................................. 307/40; 307/10 AT; 340/147 MD; 340/64
[58] Field of Search ................... 307/10 AT, 40, 115; 340/63, 64, 147 MD; 361/171, 172

[56] References Cited

U.S. PATENT DOCUMENTS

| | | | |
|---|---|---|---|
| 3,515,340 | 6/1970 | Mika | 361/172 X |
| 3,611,287 | 10/1971 | Hoff et al. | 340/63 |
| 3,691,396 | 9/1972 | Hinrichs | 307/10 AT |
| 3,754,148 | 8/1973 | Nye | 307/10 AT |

Primary Examiner—Robert K. Schaefer
Assistant Examiner—Morris Ginsburg

[57] ABSTRACT

An electrical apparatus for installation particularly in an automotive vehicle, and which serves as an anti-theft device, and wherein a proper code in a proper order must be first depressed on a switch plate by the vehicle operator in order that the vehicle engine may be started, while at a same time a burglar alarm may be disabled on the automobile.

10 Claims, 6 Drawing Figures

SEQUENTIAL CODED COMPUTERIZED ANTI-THEFT LOCK

This invention relates to burglar proof locks.

A principal object of the present invention is to provide an anti-theft lock that incorporates a computer which requires a proper sequential code input in order that it can be unlocked only by an authorized person who has knowledge of the precise input code.

Another object is to provide an anti-theft lock which is designed to be particularly adaptable for use on automotive vehicles, and wherein the lock includes a computerized electrical circuit which will turn on the vehicle ignition and unlock an electromagnetic fuel line lock.

Another object is to provide an anti-theft lock which can be otherwise used for building security, wherein it is incorporated with an integrated circuit timer, discrete circuit timer or mechanical timer.

Another object is to be able to use this device almost anywhere a key is used to unlock a door or other device.

Another object is to be able to use this device to control steering column or transmission locking devices in automobiles.

Another object is to cascade two or more devices in a custom made application to provide any number of needed digits for the sequential code.

Another object is to incorporate a bypass coded key that will enable the ignition starting circuit without the use of the sequential coded pushbutton input, thus, enabling a person to lend the use of his automobile without disclosing the sequential code.

Another object is to provide an anti-theft lock, wherein the code may be optionally changed by cutting or shorting lands on a printed circuit board, so that a new code may be quickly and easily implemented in order to make useless any previous code that may have in time been obtained by an unauthorized person.

Yet a further object is to provide an anti-theft lock in which there is a reliable circuit that uses two COS/MOS integrated circuit chips so that it has the advantages of good stability over a large temperature range, a high noise immunity, good shock resistance, low power demands, is easily adaptable to optional circuits and is easily manufactured on a printed circuit board.

Other objects are to provide a sequential coded computerized anti-theft lock, which is simple in design, inexpensive to manufacture, rugged in construction, easy to use and efficient in operation.

These and other objects will be readily evident upon a study of the following specification and the accompanying drawings, wherein.

Figure 1:
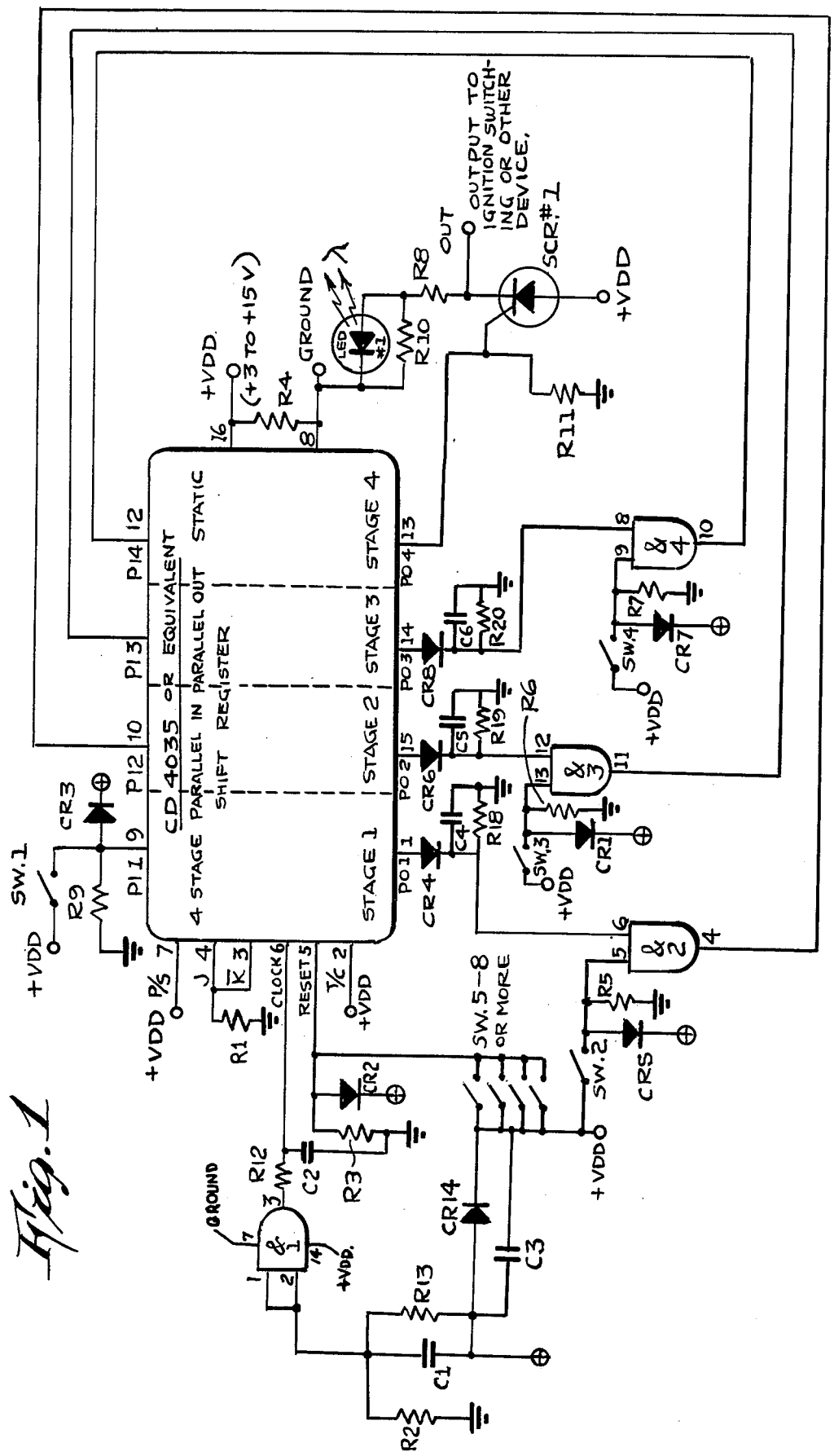
FIG. 1 is a computer logic circuit diagram and switch network.
Figure 6:
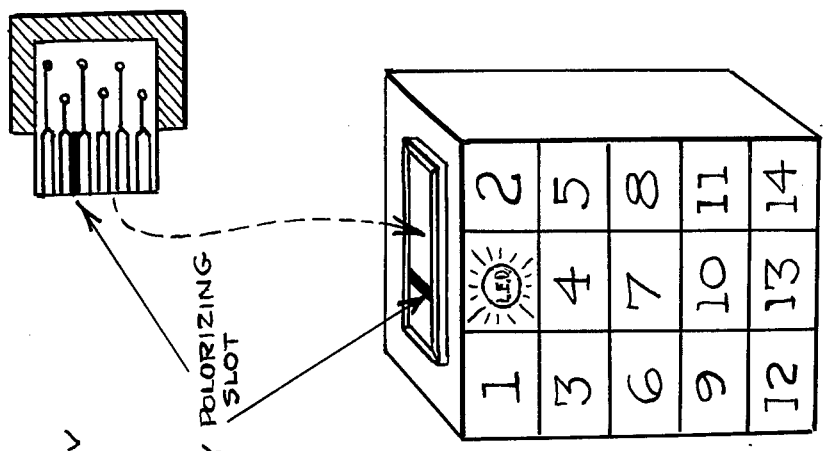
FIG. 6 is a switch plate with a bypass key consisting of a changeable code and socket.
Figure 4:
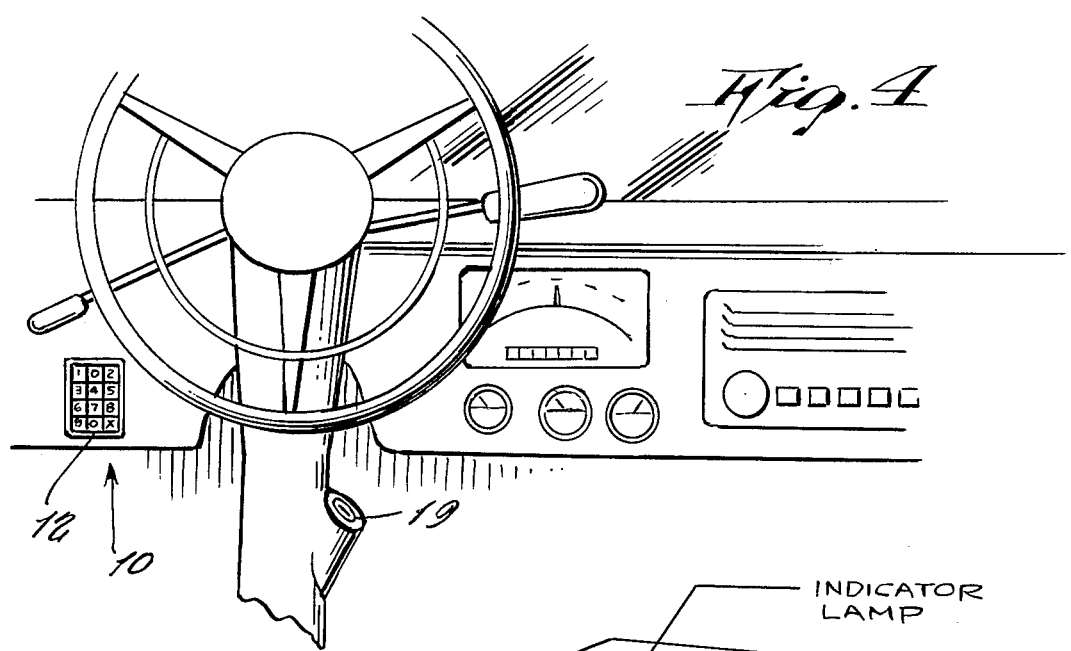
FIG. 4 is an elevation view of a switch plate that contains the switches, and showing the switch plate on a dashboard of an automotive vehicle.
Figure 5:
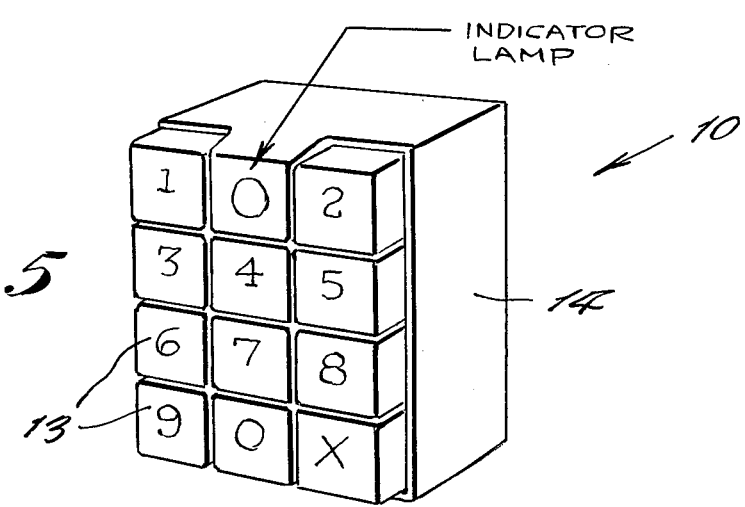
FIG. 5 is a perspective view of the switch box shown per se.

Reference is now made directly to the drawings, wherein the reference numeral 10 represents a sequential coded computerized anti-theft lock according to the present invention, wherein there is a computer logic circuit, as shown in FIG. 1, and which includes among other components a plurality of switches as indicated from SW1 through SW8. The switches are contained behind a switch plate 12 as shown in FIG. 4, wherein individual switch buttons 13 may be individually depressed in a sequence that must be in a specific correct sequential order, in order that an output end of the circuit is made operative. The circuit of FIG. 1 includes a four stage, parallel in parallel out, static shift register. The register may suitably be provided on a first chip, and the remainder of the circuit on a second chip.

Figure 3:
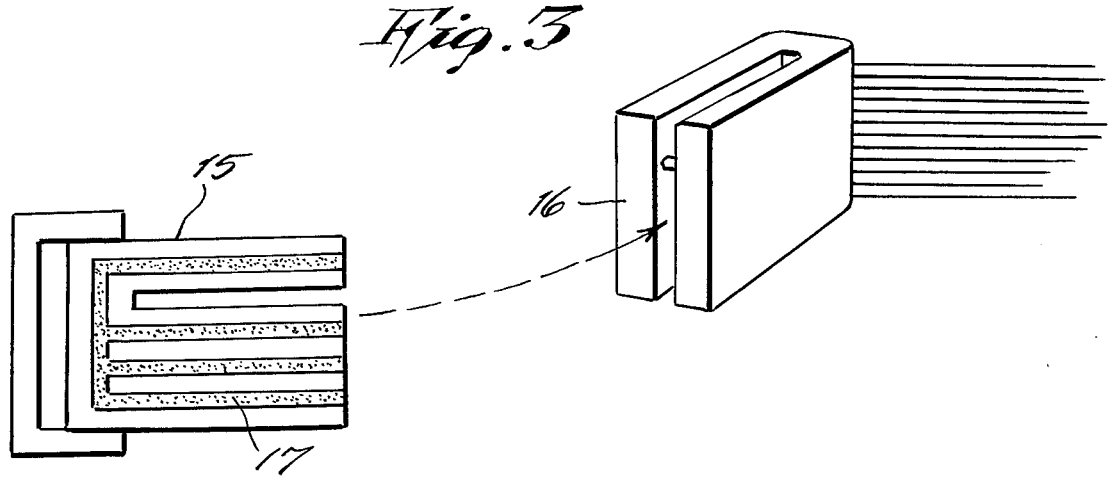
FIG. 3 is a view of a printed circuit board and a changeable code key and socket for assembly together.

The logic circuit fits into a switch box 14, as illustrated in FIG. 4. The computer logic circuit may be made on a printed circuit board, not shown. The changeable code key, 15 as shown in FIG. 3, is made on a printed circuit board, and is receivable in a slot of a socket 16. In FIG. 3, the lands of the printed circuit code key are indicated at 17 and may be cut or shorted together for desired code. The wires shown extending from socket 16 are connected to switches SW1 through SW8, in accordance with the desired switch sequence.

Figure 2:
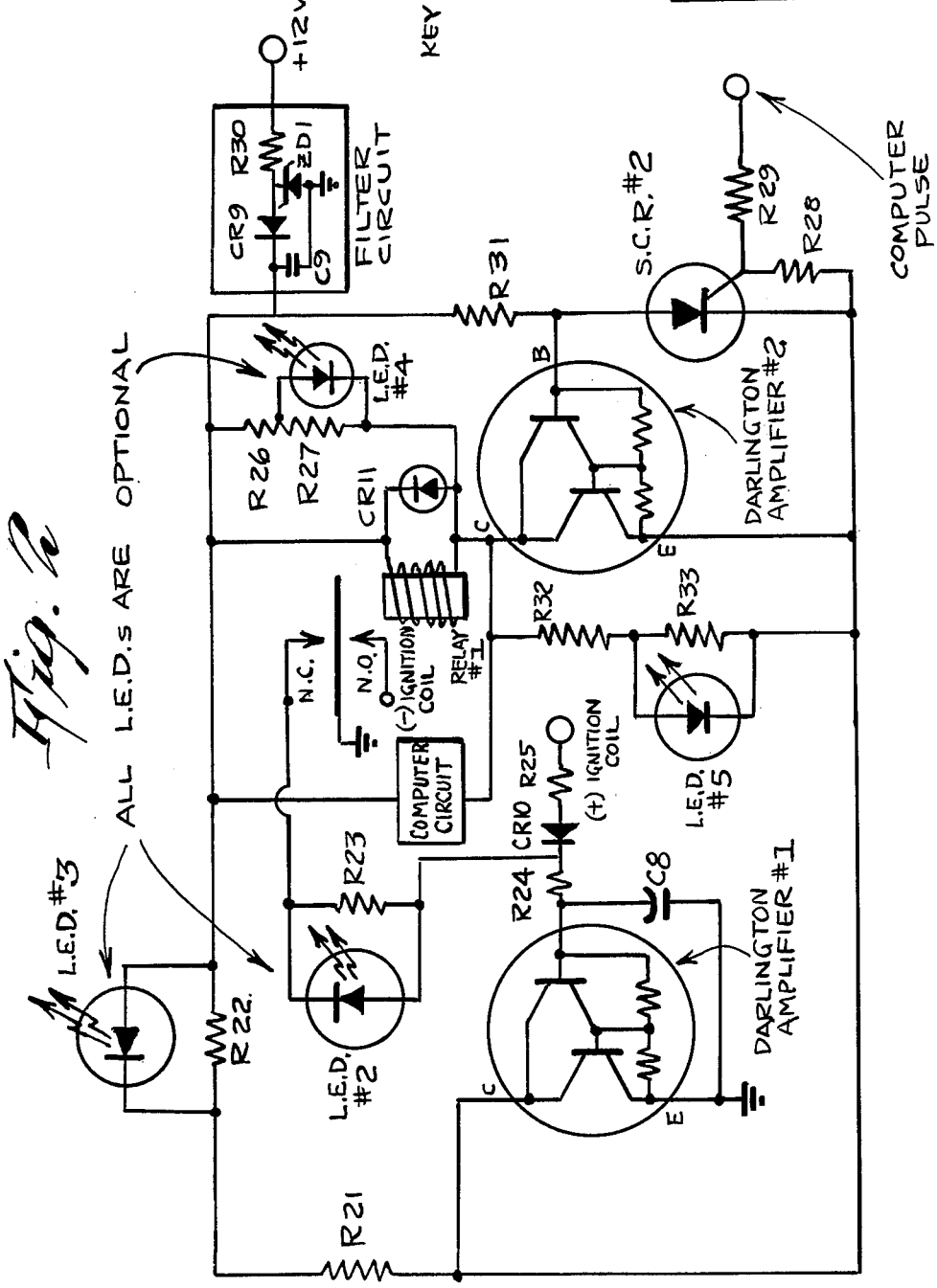
FIG. 2 is an ignition coil switching circuit.

In the computer logic circuit of FIG. 1, the "OUT" terminal is connected to the terminal designated "COMPUTER PULSE" in FIG. 2. The OUT terminal is at a low, or logical "0" level when the device has not been properly sequenced, and at a high, or logical "1" level when it has been properly sequenced. The OUT terminal may suitably be connected to a Darlington amplifier, S.C.R. or triac, depending upon the circuit application.

The circuit operation is commenced with turning the automotive ignition key to the "on" position thus providing ground to the computer circuit, which makes the computer circuit operational. For the circuit wired as shown in FIG. 1, the enabling sequence is to successively depress predetermined buttons 13 which in turn cause switching of switches SW1, SW2, Sw3 and SW4. When SW1 is thus depressed, pin 9 of the shift register has a logical 1 on it and is waiting momentarily to be locked into the first stage by a clock pulse on pin 6 of the register. The clock pulse is generated and applied to pin 6 each time a switch is closed, as discussed below. When SW1 is closed a logical 1 output is apparent on parallel output pin 1 of the register. All other inputs have logical 0 clocked into them at this time. This high output on pin 1 of the register charges capacitor C4. When SW2 is depressed "and 2" will have a logical 1 output at pin 4. This logical 1 output is fed into the input of stage 2 of the register and is momentarily waiting for the clock pulse at pin 6 to set stage 2 of the register. Similar sequences follow. After the logical 1 input is shifted into stage 2 a logical 1 output is apparent at the parallel output pin 15. When SW3 is depressed there is a logical 1 output on pin 11 of "and 3". This logical 1 output is fed into the input of stage 3 of the register and is momentarily waiting for the clock pulse at pin 6 to set stage 3 of the register. After the logical 1 input is shifted into stage 3, a logical 1 output is apparent at the parallel output pin 14. When SW 4 is depressed "and 4" will have a logical 1 output at pin 10. This logical 1 output is fed into the input of stage 4 and is momentarily waiting for the clock pulse at 6 to set stage 4 of the register. After the logical 1 input is shifted into stage 4, a logical 1 output is apparent at the parallel output pin 13. The output at pin 13 enables the gate of S.C.R. 1 to turn on S.C.R. 2. (S.C.R. 1 supplies the light emitting diode via the voltage divider circuit combination of R10 and R8;

an optional L.E.D. depending on the circuit application.) S.C.R. 1 also supplies the input of the ignition coil switching circuit or optional circuits.

Capacitors C4, C5, and C6 are used to insure that the "and" gates 2, 3 and 4 are fully propagated by holding their corresponding pins high momentarily after the corresponding register output pins go low with the clock pulse in order that the following stage loads, R18, R19, and R20 are used to fully discharge capacitors C4, C5, and C6, respectively. "And 1" is used to shape a clock input pulse from C1 each time a push button is depressed. Whenever a pushbutton is depressed, the plus supply (VDD) is placed on capacitor C1, and is communicated through "and 1" to pin 6. R13 is used to discharge capacitor C1. R2 is used to prevent "and 1" input from floating. R5, R6, and R7 are used to prevent their respective "and" inputs from floating. R9 prevents register input at pin 9 from floating. R11 prevents S.C.R. gate from floating. CR14 and C3 in parallel are used to initially reset all outputs of the register when the circuit is first powered on. C2, R12 are used to delay the clock pulse prior to entering the register.

If any switch 5 to 8 is depressed, all outputs of the register will reset, and the above indicated sequence will have to be restarted. The possibility also exists that more than one digit of the combination may be entered on the same push button.

Diodes, CR4, CR6, CR8, are used to prevent C4, C5, and C6, respectively, from discharging back through the shift register. Diodes CR2, CR3, CR5, CR1, and CR7 are used to isolate the switch pulses from each other when entering the clocking circuit. Reset diode CR2 may be omitted from the circuit. CR2 is used to insure that the register output pins are reset not only by the reset pulse but also by the clock pulse.

R1 and R3 prevent their respective register inputs from floating. R4 keeps the power inputs at the same potential if one input is removed. R8 and R10 comprise a voltage divider for LED #1.

Each time the clock pulse is entered into the shift register, it will shift all data at the parallel input pins to the parallel output pins whether the data are in the form of logical ones or zeros or both.

All parts in this circuit are commercially available including the I.C. chips and may be substituted by other corresponding commercial replacement parts. Part numbers for I.C. chips A and B are CD4035 and CD4081, respectively.

The following is the operation of the ignition coil switching circuit: (FIG. 2).

When the automobile ignition switch 19 is (closed) turned on, plus supply is connected to the (+) ignition coil, and the Darlington amplifiers 1 and 2 turn on and provide a ground path for the computer circuit. The Darlington amplifier 2 also causes relay 1 to energize. The relay 1 pulls the normally open contacts into the closed position and holds the negative side of the automobile ignition coil at ground. The relay 1 contacts may also be used to interrupt the ignition circuit on the positive side of the ignition or starting circuits. When the S.C.R. 2 turns on with the computer pulse, the Darlington amplifier 2 turns off due to the almost ground potential at the base of the Darlington amplifier 2. Then the ground is removed from the negative side of the automobile ignition coil via relay 1, and the automobile may then be started by further turning switch 19, FIG. 4, to the start position.

R21, 22, 23, 24, 26, 27, 32, 33, are used to bias their respective L.E.D.'S R28 stops SCR #2 gate from floating, R29 limits the gate current to S.C.R. #2. R25 limits base current to DA #1. CR10 stops negative transients to the base of DA #1. C8 supplies power when negative transients occur. CR11 conducts back voltage from relay coil. R30 limits current. ZD1 limits voltage. CR9 stops negative transients. C9 supplies the circuit when negative transients occur. R31 limits base current to DA #2.

The Darlington amplifiers, shown in FIG. 2, shows an internal biasing arrangement but other Darlington amplifiers may be substituted which may require external biasing resistors to be added to this circuit. The parts in this circuit are commercially available and may be substituted by their corresponding commercial replacement parts.

This circuit will be placed in a separate container and mounted in the engine compartment of the automobile.

What I now claim is:

1. A security device for enabling apparatus which is being secured, said security device being operable by inputting to it a predetermined sequence plural digit signal, comprising:
   a. a switch plate containing a first plurality of manually depressable switch buttons;
   b. circuit means comprising a second plurality of switch elements for producing an output signal when said switch elements are switched in a predetermined sequence;
   c. connecting means for connecting respective ones of said switch buttons to respective ones of said switch elements;
   d. said circuit means further comprising a plural stage parallel in parallel out static shift register and shift circuit means for shifting signals successively from the output of one of the stages to the input of the next one of said stages only when said switch elements have been switched in said predetermined sequence;
   e. output circuit means connected to an output terminal of the last stage of said register, for generating an output signal when said switch elements have been switched in said predetermined sequence;
   f. reset means for resetting said register whenever one of said switch elements is switched out of said predetermined sequence; and
   g. enabling circuit means adapted to be connected to said secured apparatus, having an input connected to said output circuit means, for enabling said secured apparatus when said output signal is generated.

2. The device as described in claim 1, wherein said switch plate comprises at least 8 pushbuttons, and said circuit means comprises less than 8 switch elements.

3. The device as described in claim 1, wherein said switch plate comprises at least 10 pushbuttons, and said circuit means comprises 4 switch elements.

4. The device as described in claim 1, wherein said circuit means comprises gate means connected to the outputs of each of said register stages but said last stage, for gating the output of each stage to the input of the next stage.

5. The device as described in claim 4, wherein each of said gate means comprises an and gate having a first input connected to the output of the corresponding stage and a second input connected to one of said switch elements.

6. The device as described in claim 5, wherein said reset means comprises some of said switch elements connected to reset said register.

7. The device as described in claim 1, wherein said connecting means comprises a changeable code key and socket, whereby said predetermined sequence can be changed.

8. The device as described in claim 1, comprising bypass means for changing said device to enable said apparatus without inputting said predetermined signal.

9. The device as described in claim 1, wherein said circuit means comprises a clock pulse circuit for inputting a clock signal to said register upon the switching of one of said switch elements, whereby all data at each parallel input terminal of said register is shifted to the corresponding parallel output terminal.

10. The device as described in claim 1, wherein said enabling circuit means is connected to said circuit means so as to control energization of said circuit means.

* * * * *